United States Patent
Lee et al.

(10) Patent No.: US 12,451,706 B2
(45) Date of Patent: Oct. 21, 2025

(54) MULTI-VOLTAGE VEHICLE OPERATION

(71) Applicant: GM Global Technology Operations LLC, Detroit, MI (US)

(72) Inventors: Chunhao J. Lee, Troy, MI (US); Yongjie Zhu, Troy, MI (US); Suresh Gopalakrishnan, Troy, MI (US); Dongxu Li, Troy, MI (US); Chen-fang Chang, Bloomfield Hills, MI (US); Junfeng Zhao, Chandler, AZ (US); Matthew Rademacher, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 677 days.

(21) Appl. No.: 17/879,972

(22) Filed: Aug. 3, 2022

(65) Prior Publication Data

US 2024/0047979 A1    Feb. 8, 2024

(51) Int. Cl.
*H02J 7/00*      (2006.01)
*B60L 58/21*     (2019.01)

(52) U.S. Cl.
CPC ............ *H02J 7/0024* (2013.01); *B60L 58/21* (2019.02)

(58) Field of Classification Search
CPC .... H02J 7/0024; B60L 58/21; B60L 2270/20; B60L 58/19; B60L 58/10; B60L 58/18
USPC ....................................................... 320/117
See application file for complete search history.

(56) References Cited

U.S. PATENT DOCUMENTS

| | | | | |
|---|---|---|---|---|
| 7,692,404 B2* | 4/2010 | Harris | ................... | H02J 7/0024 307/37 |
| 8,676,414 B2* | 3/2014 | Luo | ........................ | B60W 10/06 701/22 |
| 8,823,323 B2* | 9/2014 | Troxel | ................ | H01M 10/482 320/118 |
| 9,172,254 B2* | 10/2015 | Ganor | ........................ | H02J 7/00 |
| 10,040,363 B2* | 8/2018 | Beaston | ................... | H02J 3/322 |
| 10,500,980 B2* | 12/2019 | Conlon | ................... | H02J 3/322 |
| 10,770,908 B2* | 9/2020 | Verbridge | .............. | H02J 7/0024 |
| 10,850,725 B2* | 12/2020 | Tabatowski-Bush | ....................... | H01M 10/486 |
| 12,263,749 B2* | 4/2025 | Jiang | ......................... | B60L 58/12 |
| 2019/0140474 A1* | 5/2019 | Stoltz | ...................... | B60K 25/06 |
| 2020/0055404 A1* | 2/2020 | Conlon | ................... | B60L 53/14 |
| 2020/0376968 A1* | 12/2020 | Wang | ..................... | B60L 50/66 |
| 2021/0078429 A1* | 3/2021 | Li | .......................... | B60L 58/21 |

(Continued)

*Primary Examiner* — M Baye Diao
(74) *Attorney, Agent, or Firm* — CANTOR COLBURN LLP (57) ABSTRACT

A system in an electric or hybrid vehicle includes two or more battery packs to power one or more motors of the vehicle to move the vehicle. A controller dynamically activates an operational mode of the vehicle during vehicle operation, the operational mode being one of a plurality of possible operational modes. Each of the possible operational modes defines which of the two or more battery packs are connected to the one or more motors and, based on two or more of the two or more battery packs being connected to the one or more motors, also defines an interconnection among the two or more of the two or more battery packs. The plurality of possible operational modes includes a first operational mode defining a series connection between the two or more battery packs and second operational mode defining a parallel connection between the two or more battery packs.

20 Claims, 3 Drawing Sheets

(56) References Cited

U.S. PATENT DOCUMENTS

2021/0078442 A1* 3/2021 Prasad .................... B60L 58/19

* cited by examiner

MULTI-VOLTAGE VEHICLE OPERATION

INTRODUCTION

The subject disclosure relates to multi-voltage vehicle operation.

An electric or hybrid vehicle (e.g., automobile, truck, construction equipment, farm equipment, automated factory equipment) may include two or more battery packs that power the propulsion of the vehicle. Typically, these packs are connected in parallel for vehicle operation. That is, the two or more battery packs are connected in parallel to supply the power inverter module (PIM) of each motor. A vehicle may include one or more front and rear motors, for example. In some scenarios, the vehicle may benefit from more power. Accordingly, it is desirable to provide multi-voltage vehicle operation.

SUMMARY

In one exemplary embodiment, a system in a vehicle includes two or more battery packs to power one or more motors of the vehicle to move the vehicle, and a controller to dynamically activate an operational mode of the vehicle during vehicle operation, the operational mode being one of a plurality of possible operational modes, each of the possible operational modes defining which of the two or more battery packs are connected to the one or more motors and, based on two or more of the two or more battery packs being connected to the one or more motors, also defining an interconnection among the two or more of the two or more battery packs. The plurality of possible operational modes includes a first operational mode defining a series connection between the two or more battery packs and second operational mode defining a parallel connection between the two or more battery packs.

In addition to one or more of the features described herein, the system also includes switches. The controller dynamically controls the operational mode by controlling one or more of the switches.

In addition to one or more of the features described herein, the system also includes one or more pre-charge resistors. The controller connects one or more of the two or more battery packs to one or more of the one or more pre-charge resistors during an activation or deactivation of the operational mode.

In addition to one or more of the features described herein, the controller activates the second operational mode as the operational mode during startup of the vehicle.

In addition to one or more of the features described herein, the controller deactivates the second operational mode and activate the first operational mode as the operational mode prior to shutdown of the vehicle.

In addition to one or more of the features described herein, the controller activates the first operational mode as the operational mode during startup of the vehicle.

In addition to one or more of the features described herein, the controller deactivates the first operational mode and activate the second operational mode as the operational mode prior to shutdown of the vehicle.

In addition to one or more of the features described herein, the controller activates a third operational mode as the operational mode during startup of the vehicle, wherein the third operational mode defines that only one of the two or more battery packs is connected to the one or more motors.

In addition to one or more of the features described herein, the controller deactivates the third operational mode and activate the first operational mode as the operational mode prior to shutdown of the vehicle.

In addition to one or more of the features described herein, the controller deactivates the third operational mode and activate the second operational mode as the operational mode prior to shutdown of the vehicle.

In another exemplary embodiment, a method of assembling a system in a vehicle includes arranging two or more battery packs to power one or more motors of the vehicle to move the vehicle, and configuring a controller to dynamically activate an operational mode of the vehicle during vehicle operation, the operational mode being one of a plurality of possible operational modes, each of the possible operational modes defining which of the two or more battery packs are connected to the one or more motors and, based on two or more of the two or more battery packs being connected to the one or more motors, also defining an interconnection among the two or more of the two or more battery packs. The plurality of possible operational modes includes a first operational mode defining a series connection between the two or more battery packs and second operational mode defining a parallel connection between the two or more battery packs.

In addition to one or more of the features described herein, the configuring the controller includes the controller dynamically controlling the operational mode by controlling one or more switches.

In addition to one or more of the features described herein, the configuring the controller includes the controller connecting one or more of the two or more battery packs to one or more pre-charge resistors during an activation or deactivation of the operational mode.

In addition to one or more of the features described herein, the configuring the controller includes the controller activating the second operational mode as the operational mode during startup of the vehicle.

In addition to one or more of the features described herein, the configuring the controller includes the controller deactivating the second operational mode and activating the first operational mode as the operational mode prior to shutdown of the vehicle.

In addition to one or more of the features described herein, the configuring the controller includes the controller activating the first operational mode as the operational mode during startup of the vehicle.

In addition to one or more of the features described herein, the configuring the controller includes the controller deactivating the first operational mode and activate the second operational mode as the operational mode prior to shutdown of the vehicle.

In addition to one or more of the features described herein, the configuring the controller includes the controller activating a third operational mode as the operational mode during startup of the vehicle, wherein the third operational mode defines that only one of the two or more battery packs is connected to the one or more motors.

In addition to one or more of the features described herein, the configuring the controller includes the controller deactivating the third operational mode and activating the first operational mode as the operational mode prior to shutdown of the vehicle.

In addition to one or more of the features described herein, the configuring the controller includes the controller deactivating the third operational mode and activating the second operational mode as the operational mode prior to shutdown of the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Embodiments of the systems and methods detailed herein relate to multi-voltage vehicle operation. As previously noted, an electric or hybrid vehicle may include two or more battery packs. A battery pack refers to a plurality of batteries or battery cells that are managed by a battery management system (BMS). The battery pack and associated BMS may be referred to together as a smart battery pack. As also noted, the battery packs are typically connected in parallel during vehicle operation. Thus, for example, two 400 volt (V) battery packs may be arranged in parallel to supply 400 V to each PIM of each motor of the vehicle, as well as to different loads (e.g., integrated power electronics, air conditioning system).

Exemplary embodiments involve changing a configuration of the two or more battery packs to be in parallel or in series with one or more PIMs and one or more loads. The change may be done during vehicle operation, which refers to the vehicle being ready to drive or being driven rather than being recharged (i.e., the battery packs of the vehicle propulsion system are supplying power or are absorbing regenerative braking power). According to one or more embodiments, the battery packs may dynamically be connected in series to supply higher voltage to the PIMs and to one or more loads. This may be desirable for a higher power mode of operation, while the parallel connection of the battery packs may be desirable for a higher efficiency mode of operation. For explanatory purposes, the multi-voltage operation is described using two battery packs. However, any number of battery packs may be used and dynamically changed between series and parallel connections. For example, three 380 V battery packs may be connected in parallel to supply 380 V to the PIMs during one (e.g., higher efficiency) operational mode. The connection among the three 380 V battery packs may be dynamically changed to a series connection to supply 1140 V to the PIMs during another (e.g., higher power) operational mode.

Figure 1:
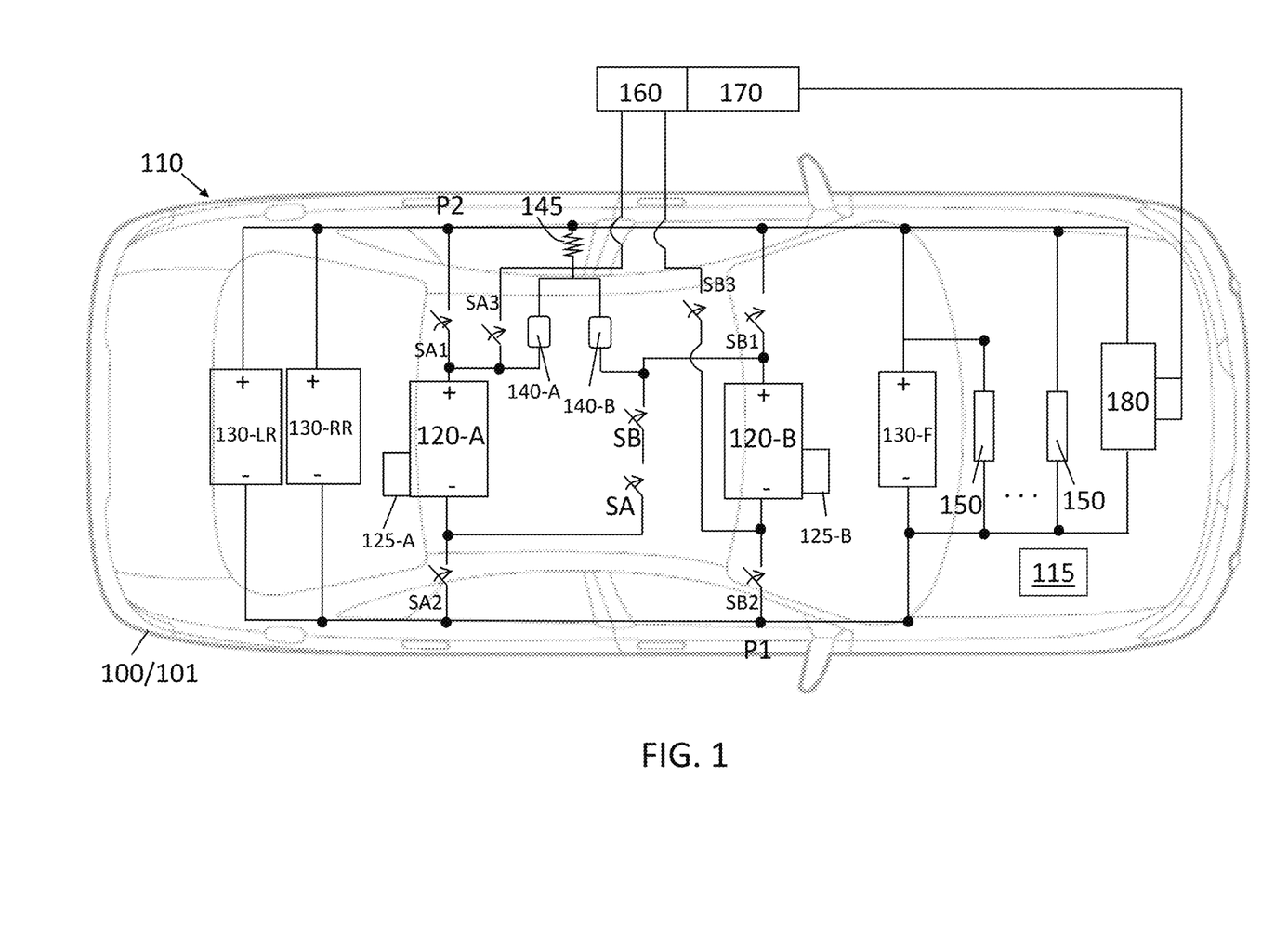
FIG. 1 is a block diagram of a vehicle with a multi-voltage propulsion system according to one or more embodiments.

In accordance with an exemplary embodiment, FIG. 1 is a block diagram of a vehicle 100 with a multi-voltage propulsion system 110. The exemplary vehicle 100 is an automobile 101. Two exemplary battery packs 120-A and 120-B (generally referred to as 120) supply a front motor 130-F, left rear motor 130-LR, and right rear motor 130-RR (generally referred to as motor 130). The battery packs 120 also supply loads 150. The battery packs 120 may be charged by a direct current fast charger (DCFC) 160 or by an on-board charging module (OBCM) 180 that is supplied by the alternating current (AC) grid 170. Each of the battery packs 120-A and 120-B is shown with a respective BMS 125-A and 125-B (generally referred to as 125).

The BMS 125 of each battery pack 120 may indicate charge state, temperature, voltage, current, and other parameters used to make decisions such as, for example, whether charging is needed. These parameters may also indicate when a dynamic change (e.g., from parallel to serial connection of the battery packs 120) may be implemented. Connection points P1 and P2 are labeled for explanatory purposes and are discussed with reference to Table 1. The propulsion system 110 includes the battery packs 120 motors 130 shown in FIG. 1, in addition to components that are not detailed herein.

The vehicle 100 is shown with a controller 115. The controller 115 may implement the dynamic change between serial and parallel connection of the battery packs 120 as detailed herein. The various switches SA1, SA2, SA3, SB1, SB2, SB3, SA, SB that are controlled to facilitate the dynamic change between serial and parallel connection of the battery packs 120 are all shown in the open position in FIG. 1 but may be controlled by the controller 115 to close, as indicated by the arrows. The implementation of the dynamic change between serial and parallel connection of the battery packs 120 based on a change in operation mode of the vehicle 100 (e.g., between high power and high efficiency) is detailed. The basis for the change in operation mode of the vehicle 100 is not detailed and may be based on a signal to the controller 115 or processing of vehicle data (e.g., speed, acceleration) by the controller 115.

The controller 115 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The memory of the controller 115 may include non-transitory computer-readable media that stores instructions that, when processed by one or more of the processors of the controller 115, implement the dynamic change.

When the battery packs 120-A and 120-B are connected in parallel to the motors 130 and loads 150, the switches SA1, SA2, SB1, and SB2 are controlled to be closed. The switches SA3 and SB3 are closed only during charging with the DCFC 160. When the battery packs 120-A and 120-B are connected in series to the motors 130 and the loads 150, the switches SA1, SA, SB, and SB2 are controlled to be closed, thereby creating a connection from point P1 through the two battery packs 120-A and 120-B to point P2. Any loads 150 that cannot accept the higher voltage that results from connection of the battery packs 120 in series may be supplied via a DC-DC converter that reduces the voltage from the battery packs 120 to a voltage accepted by the loads 150.

When the connection between the battery packs 120 is dynamically changed or when one or more battery packs 120 are first activated individually, in parallel, or in series (i.e., in a particular power mode) or when a given power mode is deactivated, an inrush of current into the motors 130 and loads 150 may result from current imbalance between the battery packs 120 and motors 130 or loads 150. To limit inrush current, pre-charge circuit contactors 140-A and 140-B and pre-charge resistor 145 are first used in a specific sequence, as indicated in Tables 1 and 2.

Table 1 indicates the sequence of control of the switches SA1-SA3, SB1-SB3, SA, and SB and pre-charge contactors 140-A, 140-B used to activate vehicle operation with a particular operational mode. The second and third columns of Table 1, respectively referred to as mode A and mode B for explanatory purposes, show the control sequences required to activate a single battery pack 120 to power the motors 130 and loads 150. The fourth and fifth columns of Table 1, respectively referred to as mode C and mode D for explanatory purposes, show the control sequences required to activate the battery packs 120-A and 120-B in parallel in a particular order. The sixth column of Table 1, referred to as mode E for explanatory purposes, shows the control sequence required for activation of the battery packs 120-A and 120-B in series. All switches SA1-SA3, SB1-SB3, SA, and SB and pre-charge contactors 140-A, 140-B are open prior to implementation of the processes shown in Table 1.

TABLE 1

Switch control for activation of different operational modes.

| steps | mode A | mode B | mode C | mode D | mode E |
|---|---|---|---|---|---|
| | Pack 120-A only | Pack 120-B only | 120-A then 120-B in parallel | 120-B then 120-A in parallel | 120-A and 120-B in series |
| 1 | close SA2 | close SB2 | close SA2 | close SB2 | close SB2 |
| 2 | close 140-A | close 140-B | close 140-A | close 140-B | close SB |
| 3 | monitor pre-charge | monitor pre-charge | monitor pre-charge | monitor pre-charge | close SA |
| 4 | close SA1 | close SB1 | close SA1 | close SB1 | close 140-A |
| 5 | open 140-A | open 140-B | open 140-A | open 140-B | monitor pre-charge |
| 6 | | | close SB2 | close SA2 | close SA1 |
| 7 | | | close SB1 | close SA1 | open 140-A |

As previously noted, the vehicle 100 may include three or more battery packs 120 rather than two battery packs 120, as shown in the exemplary illustration of FIG. 1. Thus, the procedures set out in Table 1 may be applied to the activation of other individual battery packs 120 or to additional battery packs 120 in parallel or in series with the exemplary battery packs 120-A and 120-B.

As the second and third columns of Table 1 indicate, when one of the battery packs 120 is activated individually, the negative side contactor (e.g., switch SA2 or SB2) is closed first and then the corresponding pre-charge circuit contactor (e.g., switch 140-A or 140-B) is closed. This creates a path through the individual battery pack (e.g., 120-A or 120-B) and pre-charge resistor 145. Current through the pre-charge resistor 145 is used to monitor voltage to perform fault protection. Once the pre-charge is complete (i.e., once the monitored voltage is within a threshold value of the voltage of the associated battery pack 120), the positive side contactor (e.g., switch SA1 or SB1) is closed and the corresponding pre-charge contactor (e.g., switch 140-A or 140-B) is opened. The result is that the individual battery pack 120 is connected in parallel with the motors 130 and loads 150.

As the fourth and fifth columns of Table 1 indicate, when the battery packs 120 are activated in parallel, the processes are implemented in accordance with the order in which the battery packs 120 are activated. First the process is followed for individual activation of the first battery pack 120. Next, the negative side contactor and then the positive side contactor are closed for the other battery pack 120 (or remaining battery packs 120 in the case of three or more battery packs 120 connected in parallel with the motors 130 and loads 150). Thus, in the case of battery pack 120-A being activated first and battery pack 120-B being connected in parallel, the processes from the second column of Table 1 (mode A) are implemented first and then switches SB2 and SB1 are closed. Alternately, in the case of battery pack 120-B being activated first and battery pack 120-A being connected in parallel, the processes from the third column of Table 1 (mode B) are implemented first and then switches SA2 and SA1 are closed.

The sixth column of Table 1 sets out the processes used to activate serial connection among the battery packs 120. As previously noted, these processes may be applied to the serial connection of any number of battery packs 120. For the exemplary battery packs 120-A and 120-B shown in FIG. 1, the negative side contactor of the first battery pack 120-B is connected by closing switch SB2. Then the switches SB and SA are closed, followed by the pre-charge contactor 140-A corresponding with the next battery pack 120-A in the series. Both the switches SA and SB may be present in series for redundancy, as shown. In alternate embodiments, only one switch may be used.

This results in a connection from point P1 through the first battery pack 120-B, switches SB and SA, through the next battery pack 120-A in the series, then the pre-charge contactor 140-A corresponding with that battery pack 120-A to the pre-charge resistor 145. Once the pre-charge is complete, the positive side contactor of the next battery pack 120-A in the series is closed by closing switch SA1 and its corresponding pre-charge contactor 140-A is opened. This results in a connection from point P1 through the first battery pack 120-B then, via switches SB and SA, through the next battery pack 120-A, to point P2. The series-connected battery packs 120-A and 120-B (i.e., battery packs 120 between P1 and P2) are connected in parallel with the motors 130 and loads 150.

Table 2 indicates the sequence of control of the switches SA1-SA3, SB1-SB3, SA, and SB used to deactivate vehicle operation in a particular operational mode. The sequences shown in Table 2 may be used during dynamic changes in operational mode, as well as during power down of the vehicle 100. For explanatory purposes, the same mode A through mode E labels are used in Table 2 as in Table 1 to correspond with the same operational modes.

TABLE 2

Switch control for deactivation of different power mode configurations.

| | power mode A | power mode B | power mode C | power mode D | power mode E |
|---|---|---|---|---|---|
| steps | Pack 120- | Pack 120- | 120-A then | 120-B then | 120-A and |

TABLE 2-continued

Switch control for deactivation of different power mode configurations.

| power mode A | power mode B | power mode C | power mode D | power mode E |
|---|---|---|---|---|
| A only | B only | 120-B in parallel | 120-A in parallel | 120-B in series |
| open SA1 | open SB1 | open SA1 | open SB1 | open SA1 |
| open 140-A | open 140-B | open 140-A | open 140-B | open 140-A |
| open SA2 | open SB2 | open SA2 | open SB2 | open SA |
|  |  | open SB1 | open SA1 | open SB |
|  |  | open 140-B | open 140-A | open 140-B |
|  |  | open SB2 | open SA2 | open SB2 |

As the second and third columns of Table 2 indicate, when the operational mode involves either mode A or mode B (i.e., one of the battery packs 120 was activated individually), deactivation begins with opening the positive side contactor (e.g., switch SA1 or SB1) first. Then the corresponding pre-charge circuit contactor (e.g., switch 140-A or 140-B) is opened. Typically, if activation of mode A or mode B was completed, the pre-charge circuit contactor (e.g., switch 140-A or 140-B) would already be open. Thus, this action is shown for a scenario in which activation may not have been completed (e.g., a change-of-mind scenario in which a mode change was initiated prior to full activation). Next the negative side contactor (e.g., switch SA2 or SB2) is opened for deactivation of the operational mode.

As the fourth and fifth columns of Table 2 indicate, when the operational mode involves either mode C or mode D (i.e., the battery packs 120 were activated in parallel), then deactivation may be implemented in accordance with the order in which the battery packs 120 were activated but may be deactivated in the opposite order, as well. As indicated in Table 2, one of the positive side contactors (e.g., switch SA1 or SB1) is opened, the corresponding pre-charge circuit contactor (e.g., switch 140-A or 140-B) is opened (as needed), then the corresponding negative side contactor (e.g., SA2 or SB2) is opened. This disconnects one of the battery packs (e.g., 120-A or 120-B). Then a similar procedure is followed for the remaining one or more battery packs 120. Specifically, the positive side contactor (e.g., switch SB1 or SA1) is opened, the corresponding pre-charge circuit contactor (e.g., switch 140-B or 140-A) is opened (as needed), then the corresponding negative side contactor (e.g., SB2 or SA2) is opened.

The sixth column of Table 2 sets out the processes used for deactivation when the operational mode involves mode E (i.e., serial connection among the battery packs 120). The processes set out in Table 2 assume a serial connection of the battery packs 120-A and 120-B from point P1 to point P2. The connection to point P2 is severed first by opening switch SA1. The pre-charge contactor 140-A is then opened (as needed). Switches SA and SB are opened to break the serial connection between the battery packs 120-A and 120-B. Then the pre-charge contactor 140-B is opened (as needed). Finally switch SB2 is opened to sever the connection to point P1.

Figure 2:
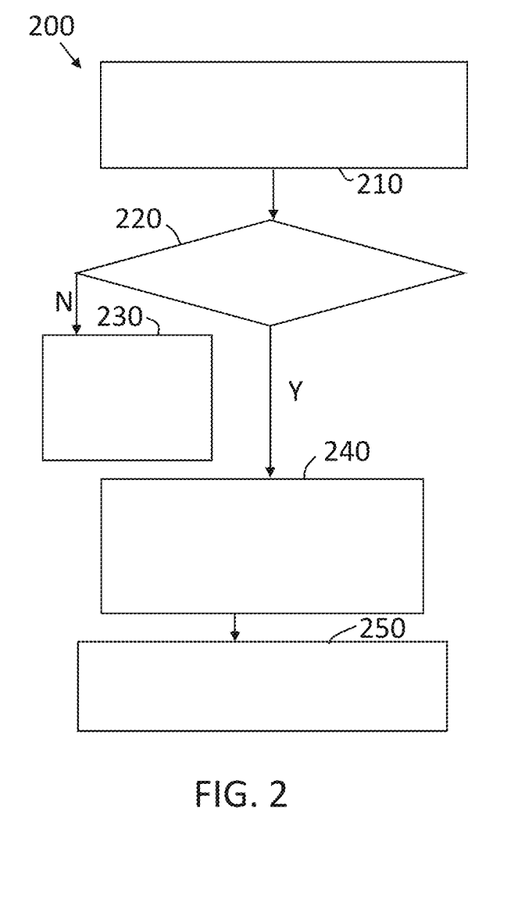
FIG. 2 is a process flow of a method of implementing multi-voltage operation of the vehicle according to an exemplary embodiment.

FIG. 2 is a process flow of a method 200 of implementing multi-voltage operation of the vehicle 100 according to an exemplary embodiment. The exemplary processes shown in FIG. 2 pertain to initially activating mode A and dynamically changing operational mode of the vehicle 100 to mode E. Thus, the voltage supplied to the motors 130 and loads 150 increases from the voltage of one battery pack 120-A to the voltage provided by the battery packs 120-A and 120-B connected in series.

At block 210, implementing activation of mode A includes implementing the processes shown in the second column of Table 1. As indicated in Table 1, switches SA1 and SA2 are closed based on the activation processes. At block 220, a check is done of whether the operational mode of the vehicle 100 has been changed to require series connection of the battery packs 120 (i.e., mode E). If not, then the deactivation of mode A is implemented, at block 230, when the vehicle 100 is shut down. The deactivation implemented at block 230 includes the processes shown in the second column of Table 2.

If, at block 220, the check indicates that the operational mode of the vehicle 100 has been changed to require series connection of the battery packs 120 (i.e., mode E), then, at block 240, the switches SA1 and SA2 are opened such that all the switches SA1-SA3, SA, SB, SB1-SB3 are open. Then, as part of the processes at block 240, the activation processes for mode E, indicated in the sixth column of Table 1, are implemented. Any further change in the operational mode of the vehicle 100 is addressed according to the discussion referencing FIG. 5. If no changes are made to the operational mode (i.e., series connection of the battery packs 120 is maintained), then, during shutdown of the vehicle 100, the deactivation processes for mode E, indicated in the sixth column of Table 2, are implemented at block 250.

Figure 3:
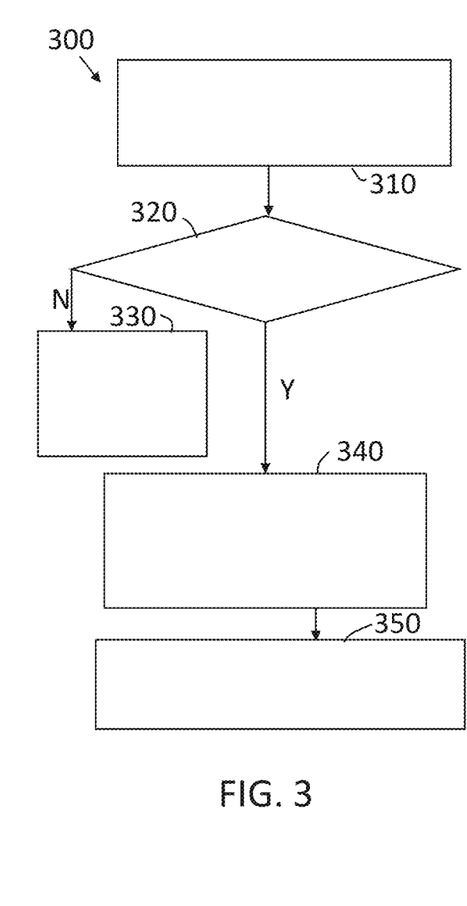
FIG. 3 is a process flow of a method of implementing multi-voltage operation of the vehicle according to an exemplary embodiment.

FIG. 3 is a process flow of a method 300 of implementing multi-voltage operation of the vehicle 100 according to an exemplary embodiment. The exemplary processes shown in FIG. 3 pertain to initially activating mode B and dynamically changing operational mode of the vehicle 100 to mode E. Thus, the voltage supplied to the motors 130 and loads 150 increases from the voltage of one battery pack 120-B to the voltage provided by the battery packs 120-A and 120-B connected in series.

At block 310, implementing activation of mode B includes implementing the processes shown in the third column of Table 1. As indicated in Table 1, switches SB1 and SB2 are closed based on the activation processes. At block 320, a check is done of whether the operational mode of the vehicle 100 has been changed to require series connection of the battery packs 120 (i.e., mode E). If not, then the deactivation of mode B is implemented, at block 330, when the vehicle 100 is shut down. The deactivation implemented at block 330 includes the processes shown in the third column of Table 2.

If, at block 320, the check indicates that the operational mode of the vehicle 100 has been changed to require series connection of the battery packs 120 (i.e., mode E), then, at block 340, the switch SB1 is opened such that all the switches SA1-SA3, SA, SB, SB1, SB3 are open except switch SB2, which is closed. Then, as part of the processes at block 340, the activation processes for mode E, indicated in the sixth column of Table 1, are implemented beginning at step 2. The closing of switch SB2 at the first step would be redundant because it is kept closed, as previously noted, following the activation of mode B. Any further change in the operational mode of the vehicle 100 (from mode E) is addressed according to the discussion referencing FIG. 5. If no additional changes are made to the operational mode (i.e., series connection of the battery packs 120 is maintained), then, during shutdown of the vehicle 100, the deactivation processes for mode E, indicated in the sixth column of Table 2, are implemented at block 350.

Figure 4:
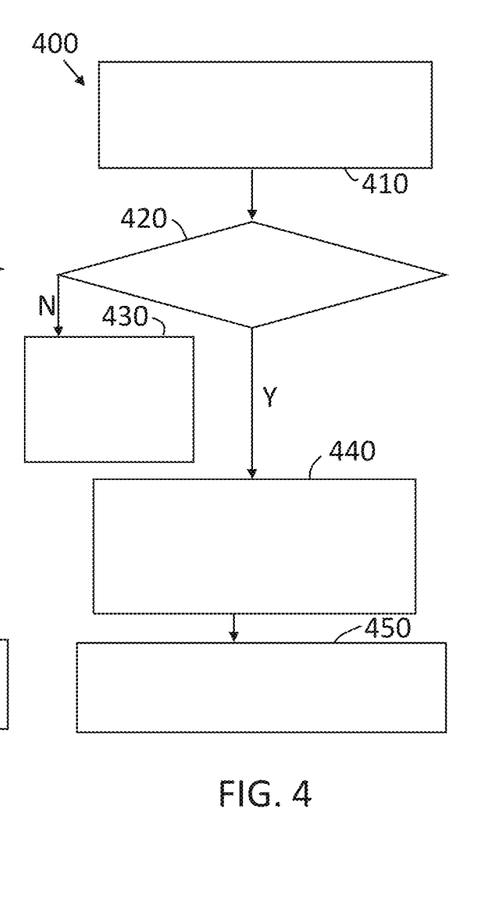
FIG. 4 is a process flow of a method of implementing multi-voltage operation of the vehicle according to an exemplary embodiment.

FIG. 4 is a process flow of a method 400 of implementing multi-voltage operation of the vehicle 100 according to an exemplary embodiment. The exemplary processes shown in FIG. 4 pertain to initially activating mode C or mode D (i.e., parallel connection of the battery packs 120) and dynamically changing the operational mode of the vehicle 100 to mode E. Thus, the voltage supplied to the motors 130 and loads 150 increases from the voltage of the two battery packs 120-A and 120-B connected in parallel to the voltage provided by the battery packs 120-A and 120-B connected in series.

At block 410, implementing activation of mode C includes implementing the processes shown in the fourth column of Table 1, while implementing activation of mode D includes implementing the processes shown in the fifth column of Table 1. As indicated in Table 1, switches SA1, SA2, SB1, and SB2 are all closed based on the activation processes, regardless of whether mode C or mode D is activated. At block 420, a check is done of whether the operational mode of the vehicle 100 has been changed to require series connection of the battery packs 120 (i.e., mode E). If not, then the deactivation of mode C or mode D is implemented, at block 430, when the vehicle 100 is shut down. The deactivation implemented at block 430 includes implementing the processes shown in the fourth column (for deactivation of mode C) or in the fifth column (for deactivation of mode D) of Table 2.

If, at block 420, the check indicates that the operational mode of the vehicle 100 has been changed to require series connection of the battery packs 120 (i.e., mode E), then, at block 440, the switches SA1, SA2, and SB1 are opened such that all the switches SA1-SA3, SA, SB, SB1, SB3 are open except switch SB2, which remains closed. Then, as part of the processes at block 440, the activation processes for mode E, indicated in the sixth column of Table 1, are implemented beginning at step 2. The closing of switch SB2 at the first step would be redundant because it is already closed as part of the activation of mode B. Any further change in the operational mode of the vehicle 100 is addressed according to the discussion referencing FIG. 5. If no changes are made to the operational mode (i.e., series connection of the battery packs 120 is maintained), then, during shutdown of the vehicle 100, the deactivation processes for mode E, indicated in the sixth column of Table 2, are implemented at block 450.

Figure 5:
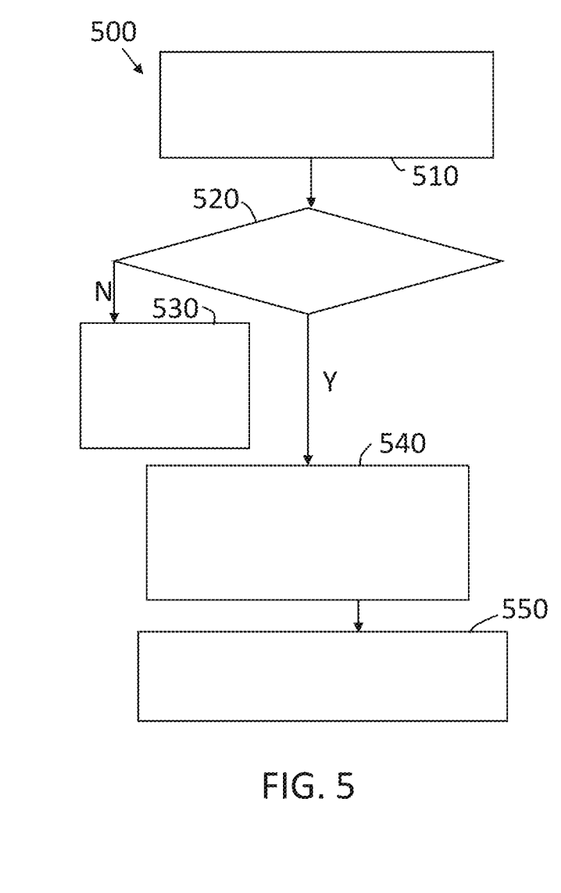
FIG. 5 is a process flow of a method of implementing multi-voltage operation of the vehicle according to an exemplary embodiment.

FIG. 5 is a process flow of a method 500 of implementing multi-voltage operation of the vehicle 100 according to an exemplary embodiment. The exemplary processes shown in FIG. 5 pertain to initially activating mode E (i.e., serial connection of the battery packs 120) and dynamically changing the operational mode of the vehicle 100 to mode C or mode D (i.e., parallel connection of the battery packs 120). While a dynamic change from serial to parallel connection of the battery packs 120 is discussed for explanatory purposes in FIG. 5 and dynamic changes to a serial connection are discussed with reference to FIGS. 2-4, Table 1 and Table 2 provide guidance for any dynamic change in operational mode. In addition, the discussion of one change in operational mode is not intended to limit the number of changes in operational mode that may occur between startup and shutdown of the vehicle 100.

At block 510, implementing activation of mode E includes implementing the processes shown in the sixth column of Table 1. As indicated in Table 1, switches SA1, SA, SB, and SB2 are all closed based on the activation processes to connect the battery packs 120-A and 120-B between points P1 and P2. At block 520, a check is done of whether the operational mode of the vehicle 100 has been changed to require parallel connection of the battery packs 120 (i.e., mode C or mode D). As previously noted, the basis for changes in operational mode are not detailed herein. In addition, the check for a change in operational mode, at block 520 (or 220, 320, 420) may be performed continuously, periodically, based on an event (e.g., receiving a control signal), or on another basis.

If the check at block 520 indicates no change in operational mode, then deactivation of mode E is implemented, at block 530, when the vehicle 100 is shut down. The deactivation implemented at block 530 includes implementing processes shown in the sixth column of Table 2. If the check at block 520 indicates that the operational mode has changed from mode E to mode C or to mode D, then the processes at block 540 are implemented. These processes differ based on whether mode C or mode D is to be activated. If mode C is to be activated, then, at block 540, switches SA1, SA, SB, and SB2 are all opened and then the activation processes, from the fourth column of Table 1, are implemented. If mode D is to be activated, then at block 540, switches SA1, SA, and SB are all opened, keeping switch SB2 closed. Then the processes for activating mode D, listed at the fifth column of Table 1, are implemented starting at step 2.

If no additional changes are made to the operational mode (i.e., parallel connection of the battery packs 120 is maintained), then, during shutdown of the vehicle 100, the deactivation processes for mode C or mode E, indicated in the fourth or fifth column of Table 2, are implemented at block 550.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system in a vehicle comprising:
   two or more battery packs configured to power one or more motors of the vehicle to move the vehicle; and
   a controller configured to dynamically activate an operational mode of the vehicle during vehicle operation, the operational mode being one of a plurality of possible operational modes, each of the possible operational modes defining which of the two or more battery packs are connected to the one or more motors and, based on two or more of the two or more battery packs being connected to the one or more motors, also defining an interconnection among the two or more of the two or more battery packs, wherein the plurality of possible operational modes includes a first operational mode defining a series connection between the two or more battery packs and second operational mode defining a parallel connection between the two or more battery packs,
   wherein the controller is configured to activate the first operational mode as the operational mode during startup of the vehicle.

2. The system according to claim 1, further comprising switches, wherein the controller is configured to dynamically control the operational mode by controlling one or more of the switches.

3. The system according to claim 2, further comprising one or more pre-charge resistors, wherein the controller is configured to connect one or more of the two or more battery packs to one or more of the one or more pre-charge resistors during an activation or deactivation of the operational mode.

4. The system according to claim 1, wherein the controller is configured to activate the second operational mode as the operational mode during startup of the vehicle.

5. The system according to claim 4, wherein the controller is configured to deactivate the second operational mode and activate the first operational mode as the operational mode prior to shutdown of the vehicle.

6. The system according to claim 1, wherein the controller is configured to deactivate the first operational mode and activate the second operational mode as the operational mode prior to shutdown of the vehicle.

7. The system according to claim 1, wherein the controller is configured to activate a third operational mode as the operational mode during startup of the vehicle, wherein the third operational mode defines that only one of the two or more battery packs is connected to the one or more motors.

8. The system according to claim 7, wherein the controller is configured to deactivate the third operational mode and activate the first operational mode as the operational mode prior to shutdown of the vehicle.

9. The system according to claim 7, wherein the controller is configured to deactivate the third operational mode and activate the second operational mode as the operational mode prior to shutdown of the vehicle.

10. The system according to claim 1, wherein the controller is further configured to monitor a state of charge or voltage of each of the two or more battery packs and to select an operational mode based at least in part on a difference in state of charge or voltage among the battery packs.

11. The system according to claim 1, further comprising a DC-DC converter configured to supply power to one or more loads that are unable to accept a voltage resulting from the series connection of the two or more battery.

12. A method of assembling a system in a vehicle, the method comprising:
arranging two or more battery packs to power one or more motors of the vehicle to move the vehicle; and
configuring a controller to dynamically activate an operational mode of the vehicle during vehicle operation, the operational mode being one of a plurality of possible operational modes, each of the possible operational modes defining which of the two or more battery packs are connected to the one or more motors and, based on two or more of the two or more battery packs being connected to the one or more motors, also defining an interconnection among the two or more of the two or more battery packs, wherein the plurality of possible operational modes includes a first operational mode defining a series connection between the two or more battery packs and second operational mode defining a parallel connection between the two or more battery packs,
wherein the configuring the controller includes the controller activating the first operational mode as the operational mode during startup of the vehicle.

13. The method according to claim 12, wherein the configuring the controller includes the controller dynamically controlling the operational mode by controlling one or more switches.

14. The method according to claim 13, wherein the configuring the controller includes the controller connecting one or more of the two or more battery packs to one or more pre-charge resistors during an activation or deactivation of the operational mode.

15. The method according to claim 12, wherein the configuring the controller includes the controller activating the second operational mode as the operational mode during startup of the vehicle.

16. The method according to claim 15, wherein the configuring the controller includes the controller deactivating the second operational mode and activating the first operational mode as the operational mode prior to shutdown of the vehicle.

17. The method according to claim 12, wherein the configuring the controller includes the controller deactivating the first operational mode and activate the second operational mode as the operational mode prior to shutdown of the vehicle.

18. The method according to claim 12, wherein the configuring the controller includes the controller activating a third operational mode as the operational mode during startup of the vehicle, wherein the third operational mode defines that only one of the two or more battery packs is connected to the one or more motors.

19. The method according to claim 18, wherein the configuring the controller includes the controller deactivating the third operational mode and activating the first operational mode as the operational mode prior to shutdown of the vehicle.

20. The method according to claim 18, wherein the configuring the controller includes the controller deactivating the third operational mode and activating the second operational mode as the operational mode prior to shutdown of the vehicle.

* * * * *